(12) United States Patent
Zhang et al.

(10) Patent No.: US 12,529,086 B2
(45) Date of Patent: Jan. 20, 2026

(54) SURFACE FUNCTIONALIZING METHOD FOR USE IN HIGH-THROUGHPUT IN SITU SYNTHESIS OF NUCLEIC ACIDS BY 3D INKJET PRINTING

(71) Applicant: DYNEGE BIOSCIENCE CORPORATION, Shanghai (CN)

(72) Inventors: Mancang Zhang, Shanghai (CN); Libing Wang, Shanghai (CN); Cailing Hou, Shanghai (CN)

(73) Assignee: DYNEGE BIOSCIENCE CORPORATION, Shanghai (CN)

( * ) Notice: Subject to any disclaimer, the term of this patent is extended or adjusted under 35 U.S.C. 154(b) by 391 days.

(21) Appl. No.: 17/793,017

(22) PCT Filed: May 18, 2021

(86) PCT No.: PCT/CN2021/094309
§ 371 (c)(1),
(2) Date: Jul. 14, 2022

(87) PCT Pub. No.: WO2022/041860
PCT Pub. Date: Mar. 3, 2022

(65) Prior Publication Data
US 2023/0052838 A1     Feb. 16, 2023

(30) Foreign Application Priority Data
Aug. 25, 2020  (CN) .......................... 202010862060.X

(51) Int. Cl.
C08J 7/04        (2020.01)
B29C 64/106   (2017.01)
(Continued)

(52) U.S. Cl.
CPC ............ *C12P 19/30* (2013.01); *B29C 64/106* (2017.08); *C08J 7/12* (2013.01); *C09C 1/28* (2013.01)

(58) Field of Classification Search
None
See application file for complete search history.

(56) References Cited

U.S. PATENT DOCUMENTS 7,794,799 B1 * 9/2010 Kim ..................... B01J 19/0046
                                                           427/457
2006/0092236 A1 * 5/2006 Kwon ..................... B41J 2/055
                                                          347/68

FOREIGN PATENT DOCUMENTS

EP          1364702 A2 *  11/2003   .......... B01J 19/0046
WO   WO-2009094711 A1 *   8/2009   ........ H01L 21/31111
(Continued)

OTHER PUBLICATIONS

International Search Report issued in corresponding International Application No. PCT/CN2021/094309, mailed Jul. 22, 2021; 6 pgs.

*Primary Examiner* — David P Turocy
(74) *Attorney, Agent, or Firm* — HAUPTMAN HAM, LLP

(57) ABSTRACT

A surface functionalizing method for use in high-throughput in situ synthesis of nucleic acids by 3D inkjet printing. The method includes subjecting a surface of a substrate to hydroxyl enrichment treatment; adding hydrophobic molecules to the surface of the substrate, the hydrophobic molecules being not reactive with phosphoramidite monomers; spraying, by a multi-channel piezoelectric inkjet head assembly, an etching ink to a predetermined area on the surface of the substrate for micro-etching, the etching ink being prepared with a fluoride compound reactive with the hydrophobic molecules; and adding hydrophilic molecules to the surface of the substrate. By using the method, a (Continued)

functionalized surface with given areas being patterned can be formed on the surface of the substrate, and then a same multi-channel piezoelectric inkjet head assembly can be directly used for subsequent high-resolution printing of phosphoramidite monomers and synthesis of nucleic acids.

11 Claims, 8 Drawing Sheets

(51) Int. Cl.
 *C08J 7/12* (2006.01)
 *C09C 1/28* (2006.01)
 *C12P 19/30* (2006.01)

(56) References Cited

FOREIGN PATENT DOCUMENTS

| | | | | |
|---|---|---|---|---|
| WO | WO-2013184559 A1 | * | 12/2013 | ............... B05D 5/02 |
| WO | WO-2015031849 A1 | * | 3/2015 | .......... B01F 13/0071 |

\* cited by examiner

Fig. 3A
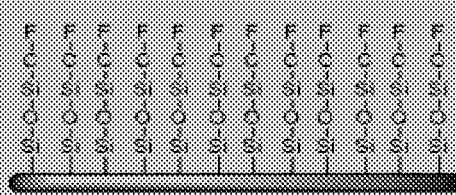
Fig. 3B
Fig. 3C
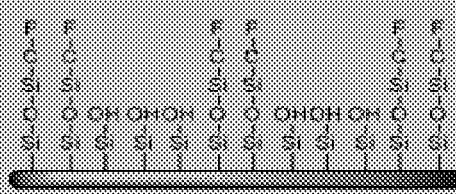
Fig. 3D
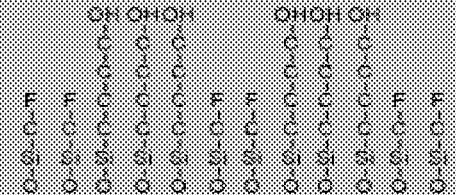
Fig. 3E
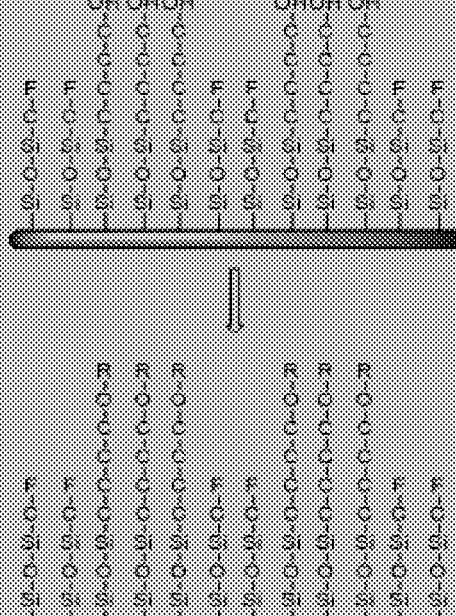

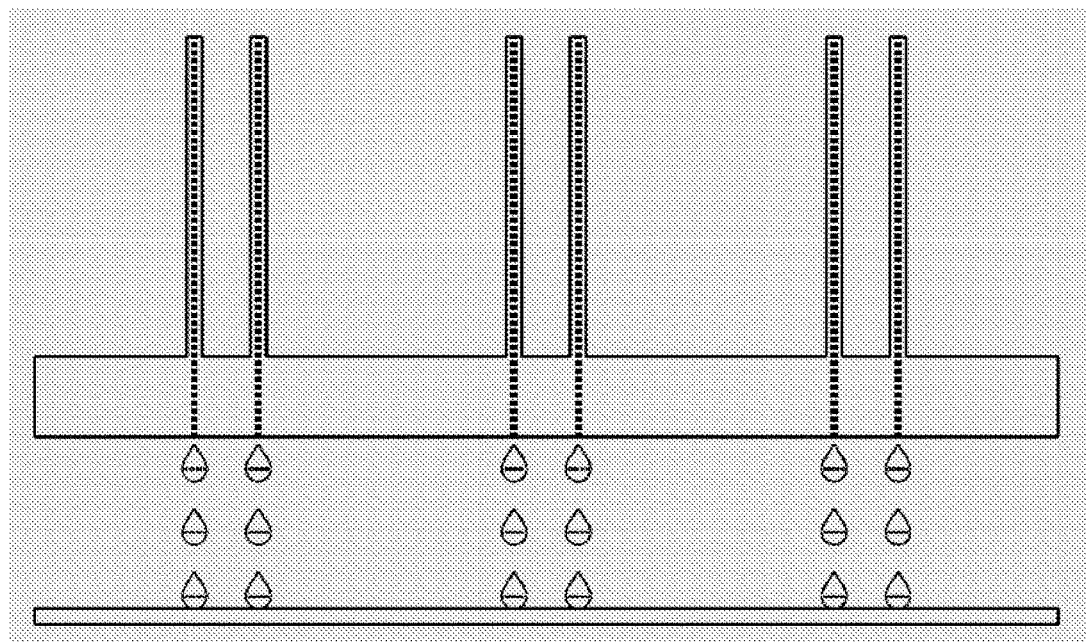
Fig. 5B
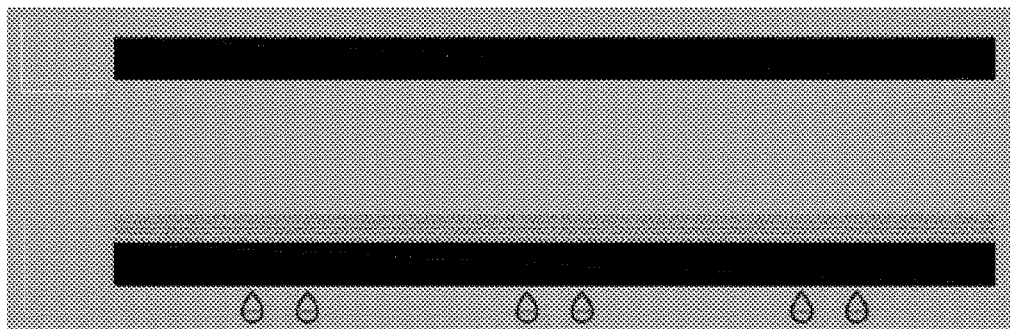
Fig. 6A
Fig. 6B
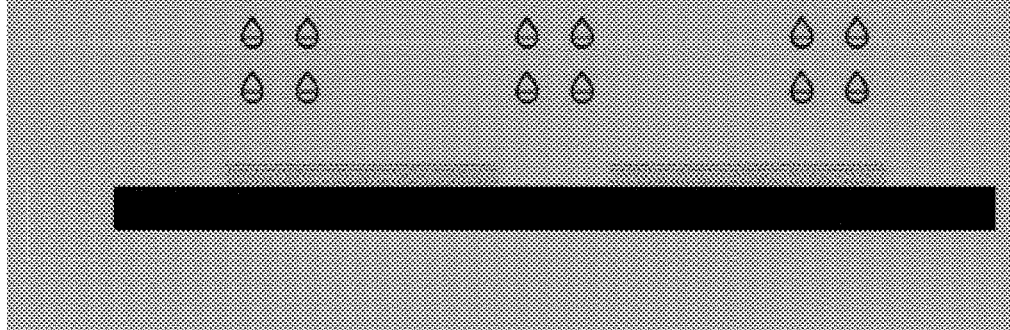
Fig. 6C
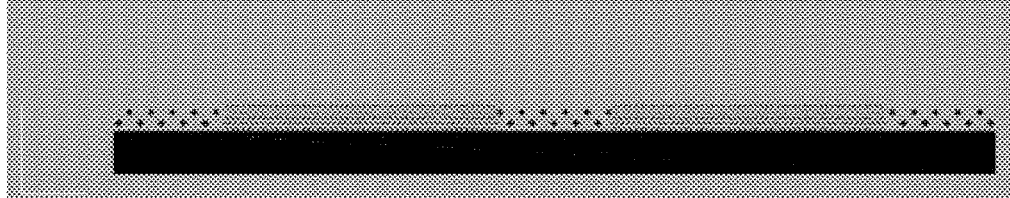
Fig. 6D

SURFACE FUNCTIONALIZING METHOD FOR USE IN HIGH-THROUGHPUT IN SITU SYNTHESIS OF NUCLEIC ACIDS BY 3D INKJET PRINTING

RELATED APPLICATIONS

The present application is a U.S. National Phase of International Application Number PCT/CN2021/094309 filed May 18, 2021, and claims priority to Chinese Application Number 202010862060.X filed Aug. 25, 2020.

FIELD OF THE INVENTION

The present disclosure relates to a surface functionalizing method for use in high-throughput in situ synthesis of nucleic acids by 3D inkjet printing, which belongs to the field of synthetic biology.

BACKGROUND OF THE INVENTION

High-throughput synthesis of oligonucleotides is a powerful tool for synthetic biology. Traditional synthesis methods for oligonucleotides are column synthesis based on phosphoramidite chemistry, where each oligonucleotide is synthesized in a separate synthesis tube or in a column of a synthesis plate, at a high yield, usually in nmol scale, but such synthesis consumes too much reagents and is costly and achieves limited throughput. The new generation of DNA synthesis technology realizes high-throughput synthesis of oligonucleotides mainly through large-scale parallel synthesis. High-throughput synthesis of oligonucleotides mainly includes on-chip photochemical in situ synthesis, electrochemical in situ synthesis, microfluidics-based synthesis, and in situ synthesis by 3D inkjet printing. The on-chip photochemical in situ synthesis, due to issues such as the high cost of photosensitive deprotected monomers and the short length that is synthesized, has been limited to very few application scenarios such as gene chips. The electrochemical in situ synthesis is being gradually eliminated due to high synthesis error rate. The microfluidics-based synthesis requires the introduction of micro-pumps and micro-valves, which leads to relatively complex structure and operations and reduced efficiency, and therefore it has not become a predominant method. The in situ synthesis by 3D inkjet printing based on glass slides or silicon slice microarrays, due to its high throughput, low cost, and ability to achieve a relatively long synthesized length, has gradually become a mainstream high-throughput synthesis method for oligonucleotides.

One of the critical difficulties of in situ inkjet printing is how to realize, without physical separation, on the surface of a glass slide or a silicon slice substrate which is used as the carrier for DNA synthesis, independent partitions on which each droplet undergoes a chemical reaction, i.e., how to stabilize droplets in specific positions by taking advantage of a difference in hydrophobicity and hydrophilicity between groups on the surface, or, how to realize physical partitions between active chemical reaction areas and inert areas by means of different surface free energies. Current methods for treating glass slides usually employ silanizing reagents in different proportions, typically including a mixture of hydrophilic silane and hydrophobic silane in different proportions. Hydrophilic groups provided by the hydrophilic silane are used to react with subsequent phosphoramidite monomers for synthesis, and hydrophobic groups provided by the hydrophobic silane help to immobilize the droplets in specific positions by taking advantage of surface tension. The surface of a glass slide is usually uniform, with a large number of hydrophobic groups and a small number of hydrophilic groups evenly distributed. This is because the surface needs to have strong hydrophobicity so that a reaction reagents, namely "ink droplets", can maintain good morphology after falling on the glass slide, so as to ensure that different types of monomers can approach each other in which case throughput can be improved, and meanwhile do not interfere with each other in which case sequence accuracy can be improved. During the treatment of a glass slide, improvement of hydrophobicity is typically to block hydrophilic groups-hydroxyl groups on the glass slide using a reagent with a hydrophobic group, but hydroxyl groups are reactive sites for DNA synthesis and such blocking certainly will be accompanied by a reduction in reactive sites, i.e. a reduction in the yield of DNA molecules per sequence. To sum up, there is a dialectical relationship between hydrophilicity and hydrophobicity and between yield and throughput in the conventional methods for treating glass slides. Surface treatment and functionalization based on silicon slice surfaces, by using a complex photolithography technology, enables a 100-300 nm electromagnetic radiation to pass through a specifically patterned mask to create specific reaction areas, so that non-irradiated areas contain hydrophobic molecules with low free energy, namely synthesis of inert groups, while irradiated areas contain hydrophilic molecules with high free energy. However, this method requires integration of photolithography devices and printing devices, especially complex calibration during the printing process in order to ensure that printing droplets fall precisely on active areas formed after photolithography. Sophisticated immobilization and calibration apparatus makes the devices expensive. Calibration is used for synthesis of reactive groups. Complicated photo-masks and apparatus significantly increase the cost in treatment of silicon slices. Meanwhile, printing on opaque silicon materials cannot be used for the development of diagnostic products such as gene chips. In addition to the photo machining, there are also studies on local treatment based on MEMS heating elements for high-throughput DNA synthesis. The above-mentioned surface functionalizing methods for use in high-throughput in situ synthesis of nucleic acid by 3D inkjet printing have their own advantages and disadvantages. It is therefore necessary to continue to develop a new high-efficiency and low-cost surface functionalizing method for use in high-throughput in situ synthesis of nucleic acids by 3D inkjet printing that can meet the needs of related applications.

SUMMARY OF THE INVENTION

An objective of the present disclosure is to provide a surface functionalizing method for use in high-throughput in situ synthesis of nucleic acids by 3D inkjet printing. Surfaces treated by the present disclosure can be used for simultaneous droplets in situ etching by a multi-channel piezoelectric inkjet head assembly, as well as subsequent addition of functional groups to the surface for efficient synthesis of oligonucleotides without calibration. The method solves the high cost problem of current surface functionalizing methods that require complex photolithography technology and calibration devices, and the contradiction in the conventional glass slide surface functionalizing methods that the yield and the throughput cannot be improved at the same time.

The surface functionalizing method for use in high-throughput in situ synthesis of nucleic acids by 3D inkjet printing provided by the present disclosure includes the following steps:

1) subjecting a surface of a substrate to hydroxyl enrichment treatment;

2) adding hydrophobic molecules to the surface of the substrate, wherein the hydrophobic molecules do not react with phosphoramidite monomers;

3) spraying, by a multi-channel piezoelectric inkjet head assembly, an etching ink to a predetermined area on the surface of the substrate for micro-etching, wherein the etching ink is prepared with a fluoride compound, wherein the fluoride compound reacts with the hydrophobic molecules; and 4) adding hydrophilic molecules to the surface of the substrate, by which functionalizing of the surface of the substrate is realized.

In the above method, the substrate is a high-purity quartz glass slide or a silicon slice provided with a silicon dioxide coating (such as a silicon wafer provided with a silicon dioxide layer), in, for example, 4 inches, 5 inches, 6 inches, 8 inches, 12 inches, etc.

In the above method, in step 1), a piranha solution is used to carry out the hydroxyl enrichment treatment. The substrate may be incubated in the piranha solution at room temperature for 10-120 minutes, during which process a large number of air bubbles are produced.

The process of preparing the piranha solution will be accompanied by a violent exothermic phenomenon, and therefore hydrogen peroxide should be carefully poured into concentrated sulfuric acid along an inner wall of a beaker with constant stirring to speed up heat dissipation.

In the above method, in step 2), the hydrophobic molecules may be perfluorooctyltrichlorosilane (FOTS), (tridecafluoro-1,1,2,2-tetrahydrooctyl)trichlorosilane, or (tridecafluoro-1,1,2,2-tetrahydrooctyl)trimethoxysilane. All these reagents have strong hydrophobicity and meanwhile are capable of effectively blocking hydroxyl groups.

In the above method, in step 3), the fluoride compound refers to a fluorine-containing compound capable of generating fluoride ions, and may be at least one selected from the group consisting of ammonium fluoride, tetrabutylammonium fluoride, phenyltrimethyl ammonium fluoride, triethylamine trihydrofluoride, and pyridine hydrofluoride.

In the above method, in step 3), a solvent is used for preparing the etching ink, and the solvent has the following characteristics.

1) The solvent has certain capability of dissolving the fluoride compound.

2) The etching ink prepared with the solvent is capable of forming ink droplets with good morphology when sprayed through a nozzle of the multi-channel piezoelectric inkjet head assembly.

The solvent used for preparing the etching ink is preferably one or more selected from the group consisting of polypropylene carbonate, polyethylene glycol, acetonitrile, 2-methylglutaronitrile, and 3-methoxypropionitrile.

The etching ink is capable of reacting with the hydrophobic molecules of the first layer added on the surface of the substrate, i.e., the hydrophobic molecules of the first layer are broken at a specific position to generate active groups. After wet etching by the etching ink, a large number of hydroxyl groups are exposed in given patterned and printed areas, which can increase not only reactive sites but also hydrophilicity, while non-printed areas still retain highly hydrophobic perfluorosilane molecules (i.e., the hydrophobic molecules). This forms a great difference in hydrophilicity and hydrophobicity, which is more conducive to maintenance of morphology of printing droplets.

In the above method, in step 4), the hydrophilic molecules may be 3-glycidyloxypropyltrimethoxysilane, N-(3-triethoxysilylpropyl)-4-hydroxybutyramide, 11-acetoxyundecyltriethoxysilane, n-decyltriethoxysilane, (3-aminopropyl) trimethoxysilane, (3-aminopropyl)triethoxysilane, or 3-iodo-propyltrimethoxysilane.

The hydrophilic molecules only react with hydroxyl groups in given areas, and do not react with the hydrophobic molecules of the first layer.

After adding the hydrophilic molecules, long-chain spacer molecules may be added. The long-chain spacer molecules combine with the hydrophilic molecules in patterned areas formed after printing, and are capable of reacting only with the hydrophilic molecules in given patterned areas and not capable of reacting with the hydrophobic molecules of the first layer, by way of which steric hindrance during subsequent synthesis of oligonucleotides can be reduced. Then general linker molecules are added. The general linker molecules combine with the spacer molecules of the third layer in patterned areas formed after printing. The general linker molecules of the fourth layer are capable of reacting only with the spacer molecules of the third layer in given patterned areas and not capable of reacting with the hydrophobic molecules of the first layer. The general linker molecules are used to link subsequent phosphoramidite monomers used for synthesis of oligonucleotides, and can be easily cleaved from the substrate.

The multi-channel piezoelectric inkjet head assembly used in the present disclosure includes six channels, each channel including 180-256 independent nozzles. The first channel is used for inkjet printing of an activator Tetrazole. The second, third, fourth and fifth channels are used for inkjet printing of four types of phosphoramidite monomers, including 2'-F-Ac-dC phosphoramidite monomer, DMF-dG phosphoramidite monomer, def-dA phosphoramidite monomer, TBB-dT phosphoramidite monomer, and other types of phosphoramidite monomers containing protective groups. The sixth channel is used for printing of the fluoride compound etching ink. This enables subsequent high-resolution printing of the phosphoramidite monomers and synthesis of nucleic acids directly using the same multi-channel piezoelectric inkjet head assembly.

BRIEF DESCRIPTION OF THE DRAWINGS

FIGS. 3A-3E are a schematic process flow showing functionalization of a surface with two different coating materials (a hydrophobic molecular layer and a hydrophilic molecular layer) by the fluoride etching ink printing method.

FIG. 5B is a side perspective schematic diagram showing the piezoelectric inkjet printing by the first to sixth channels onto the surface of the substrate.

FIGS. 6A-6D are a schematic flow chart showing forming of a patterned surface including different active and inactive functionalized areas by the fluoride etching ink printing method.

DETAILED DESCRIPTION OF THE EMBODIMENTS

Experimental methods used in the following embodiments are conventional methods unless otherwise specified.

Materials, reagents and so on used in the following embodiments are commercially available unless otherwise specified.

1. Pretreatment of a Surface to be Functionalized 1.1 High-purity quartz glass, with its main component being silicon dioxide and hereinafter referred to as glass slide, was used as a substrate.

1.2 The glass slide was ultrasonically rinsed with deionized water for 30 minutes and then dried at 80° C.

1.3 The glass slide was immersed in a freshly prepared piranha solution ($H_2SO_4$/30% $H_2O_2$, volume ratio being 3:1), and incubated for 1 hour at room temperature, in which case a large number of air bubbles were generated. It should be noted that the process of preparing the piranha solution will be accompanied by a violent exothermic phenomenon, and therefore hydrogen peroxide should be carefully poured into concentrated sulfuric acid along an inner wall of a beaker with constant stirring to speed up heat dissipation. The solution is very corrosive and should be handled with care.

1.4 The above glass slide was transferred to a new staining tank, rinsed with a large amount of deionized water for several times until resultant wastewater was nearly neutral, then soaked in acetonitrile for 20 seconds, taken out and quickly dried with nitrogen.

2. Treatment for a First Layer of Hydrophobic Molecules 2.1 The dried glass slide was immersed in a freshly prepared 0.02 M FOTS solution in dichloromethane, and incubated at room temperature for 30 minutes in a dry atmosphere.

2.2 The glass slide was taken out, rinsed successively with dichloromethane and acetonitrile, and then dried for later use.

3. Preparation of a Fluoride Compound Etching Ink 3.1 The fluoride compound etching ink was prepared as follows. Trifluoroacetic acid was dropwise added to 2M TBAF solution in polypropylene carbonate to adjust the pH to near neutral (pH=6-7) to obtain the fluoride compound etching ink.

4. Etching by Printing and Post-Treatment 4.1 The ink was rinsed off with a large amount of absolute ethanol to terminate an etching reaction. After being dried, the glass slide was fully coated with GOPS (i.e., a second layer of hydrophilic molecules) or a general linker solution in DMF for a reaction overnight at room temperature in a dry atmosphere, and then rinsed with a large amount of acetonitrile solution and dried for later use. The treatment of the glass slide in this step can effectively prevent re-hydrophobicization of etched areas, thus playing the role of immobilizing hydrophilic groups. Meanwhile, the addition of the general linker can make it easier to cut final synthesized oligonucleotides from the glass slide.

Figure 1:
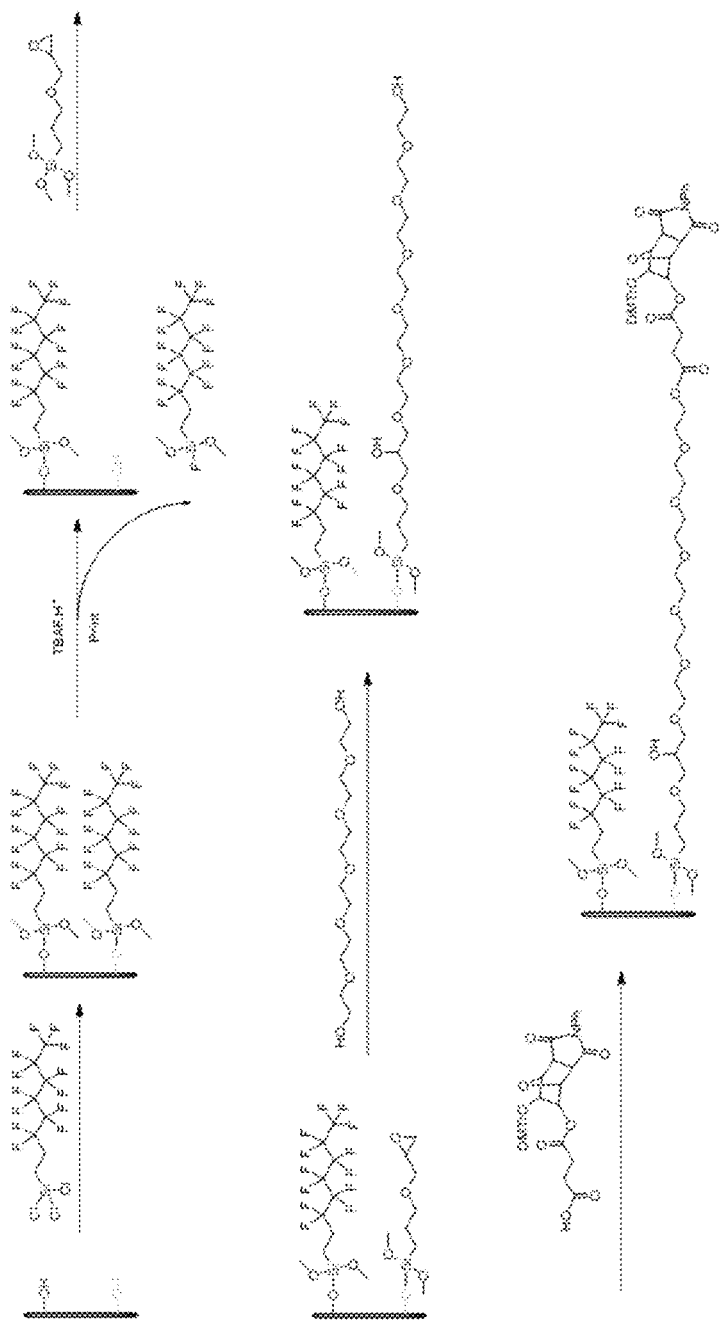
FIG. 1 is a schematic diagram of formulas of chemical reactions occurred during patterning by a fluoride etching ink printing method.

Formulas of chemical reactions occurred during the above treatment are shown in FIG. 1. From the right column to the left column, the first reaction is adding the first layer of hydrophobic molecules to the surface of the silicon dioxide; the second reaction is the fluoride compound selectively removing the hydrophobic molecules from a given area; the third reaction is selectively adding a layer of hydrophilic molecules to the given area; the fourth reaction is adding a layer of spacer molecules to the layer of hydrophilic molecules; and the fifth reaction is adding the general linker molecules for use in synthesis and subsequent cutting of oligonucleotides.

Figure 2A:
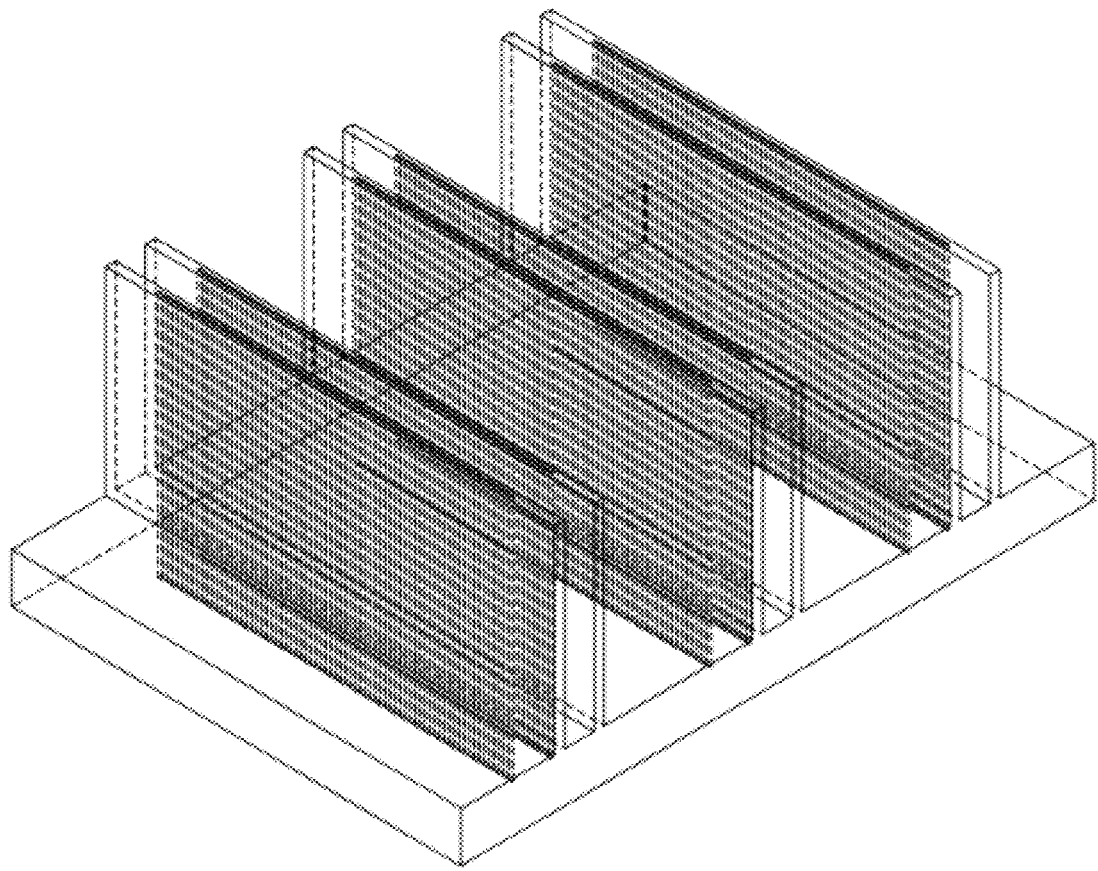
FIG. 2A is an overall schematic diagram of a multi-channel piezoelectric inkjet head assembly.
Figure 2B:
FIG. 2B is a side perspective schematic diagram of the multi-channel piezoelectric inkjet head assembly.
Figure 2C:
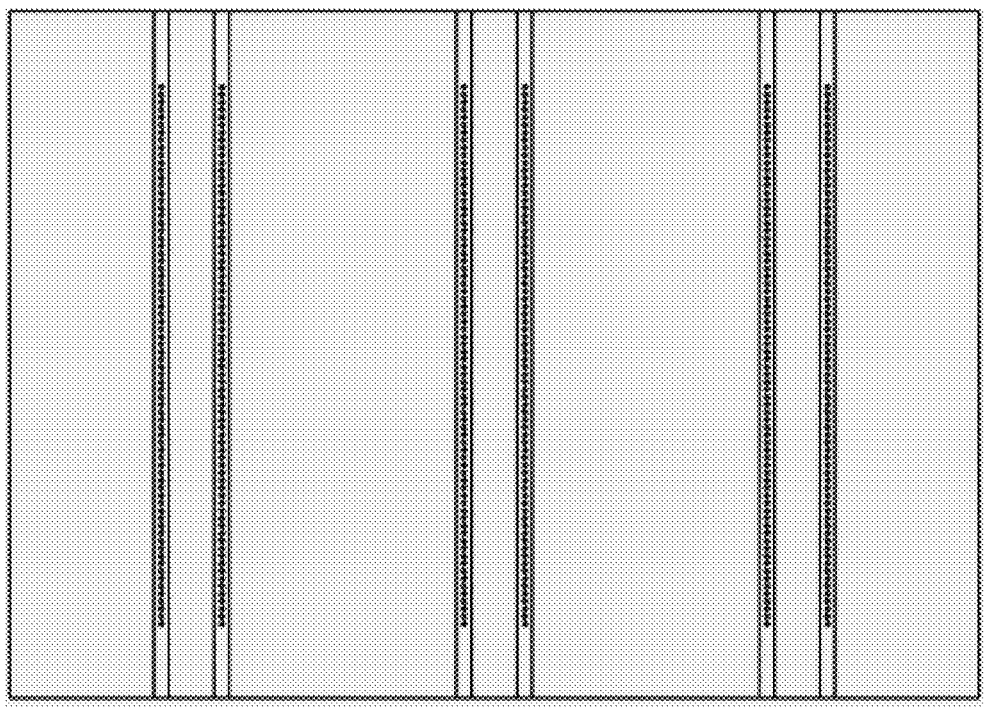
FIG. 2C is a bottom perspective schematic diagram of the multi-channel piezoelectric inkjet head assembly.
Figure 5A:
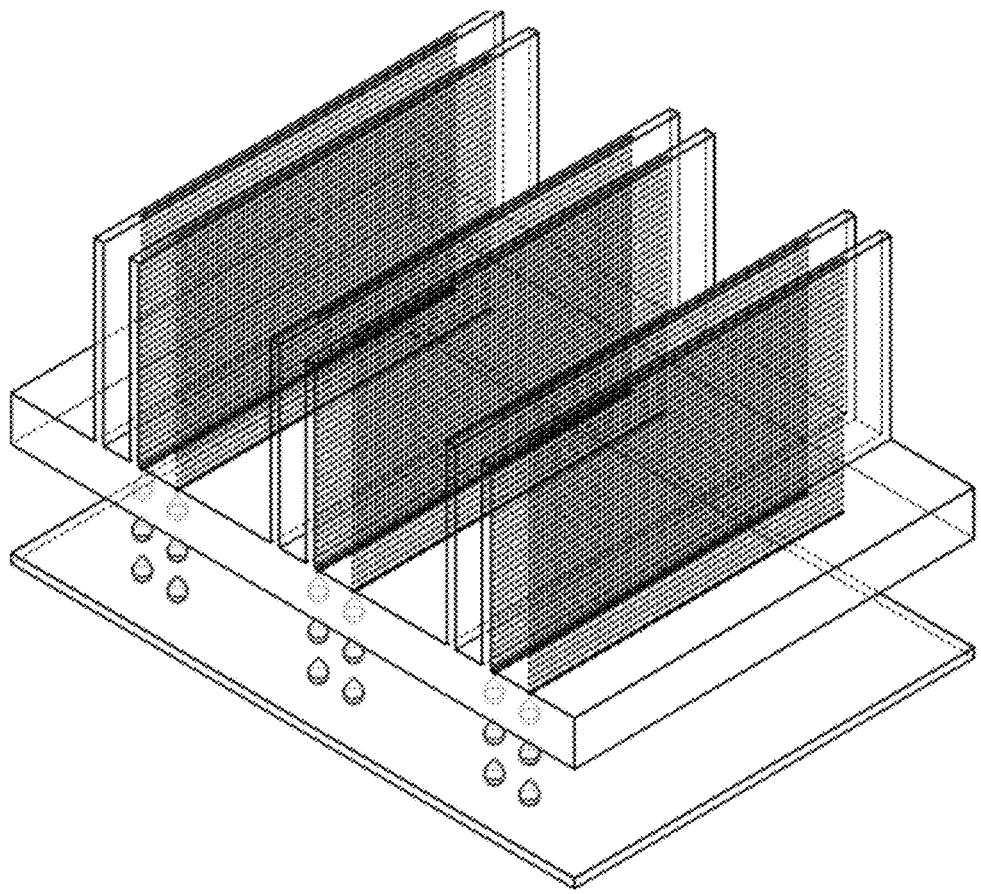
FIG. 5A is a schematic diagram showing piezoelectric inkjet printing by first to sixth channels onto the surface of the substrate.

The present embodiment adopts a multi-channel piezoelectric inkjet head assembly with six channels, each channel including 180-256 independent nozzles. The first channel is used for inkjet printing of an activator Tetrazole; the second, third, fourth and fifth channels are used for inkjet printing of four types of phosphoramidite monomers, including 2'-F-Ac-dC phosphoramidite monomer, DMF-dG phosphoramidite monomer, def-dA phosphoramidite monomer, and TBB-dT phosphoramidite monomer; and the sixth channel is used for printing of the fluoride etching ink. An overall schematic diagram of the multi-channel piezoelectric inkjet head assembly is shown in FIG. 2A, a side perspective schematic diagram thereof is shown in FIG. 2B, and a bottom perspective schematic diagram thereof is shown in FIG. 2C. A schematic diagram showing printing by the six channels onto the surface of the substrate is shown in FIG. 5A, and a side perspective schematic diagram thereof is shown in FIG. 5B.

FIGS. 3A-3E are a schematic process flow showing functionalization of a surface with two different coating materials by the fluoride etching ink printing method (it is different from FIG. 1 in that it is viewed from the perspective of a given area of the surface). The first step represents treatment for a layer of hydrophobic molecules (FIG. A-FIG. B); the second step represents selective etching with a fluoride compound (FIG. B-FIG. C); the third step represents addition of a layer of hydrophilic molecules (FIG. C-FIG. D); and the fourth step represents addition of a layer of a linker used for synthesis of oligonucleotides on the layer of hydrophilic molecules (FIG. D-FIG. E).

Figure 4:
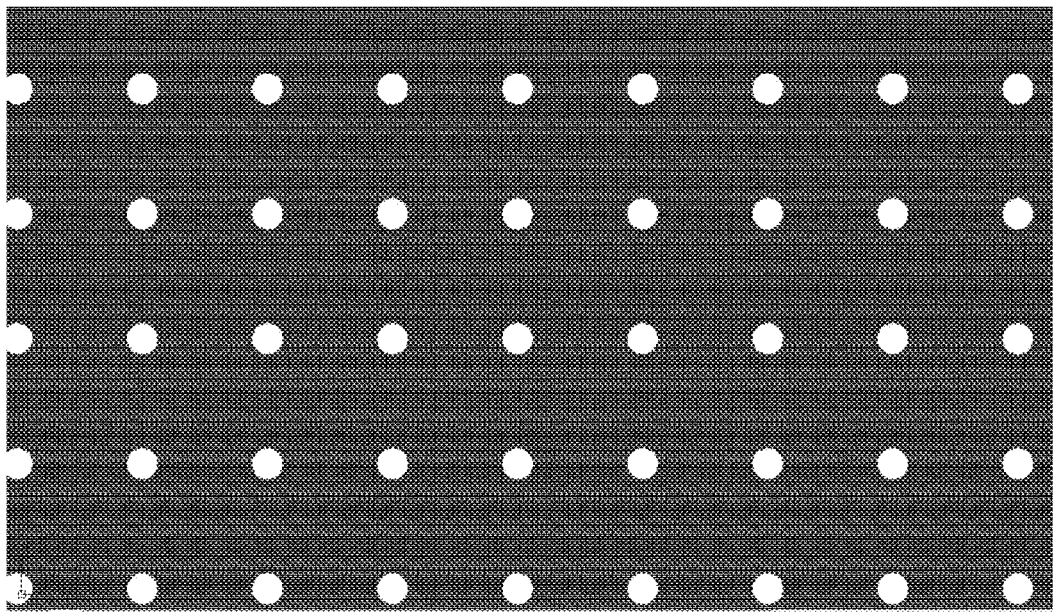
FIG. 4 is a schematic diagram of reaction active areas (white) and reaction inactive areas (gray) patterned on the surface treated and functionalized by the fluoride etching ink printing method, with oligonucleotides layers extending from active functionalized surfaces.

FIG. 4 is a schematic diagram of reaction active areas (areas inside the white circles represent the reaction active areas) and reaction inactive areas (gray) patterned on the surface treated and functionalized by the fluoride etching ink printing method of the present embodiment, with oligonucleotide layers extending from active functionalized surfaces.

FIGS. 6A-6D are a schematic flow chart showing forming of a patterned surface including different active and inactive functionalized areas by the fluoride etching ink printing method of the present embodiment. The first step represents treatment for a layer of hydrophobic molecules (FIG. A-FIG.

B); the second step represents selective etching treatment with a fluoride compound (FIG. B-FIG. C); the third step represents addition of a layer of hydrophilic molecules and a layer of a linker used for synthesis of oligonucleotides (FIG. C-FIG. D), oligonucleotides being to be synthesized on the active functionalized areas on the surface (the areas filled with the black crosses in the figure).

Figure 7A:
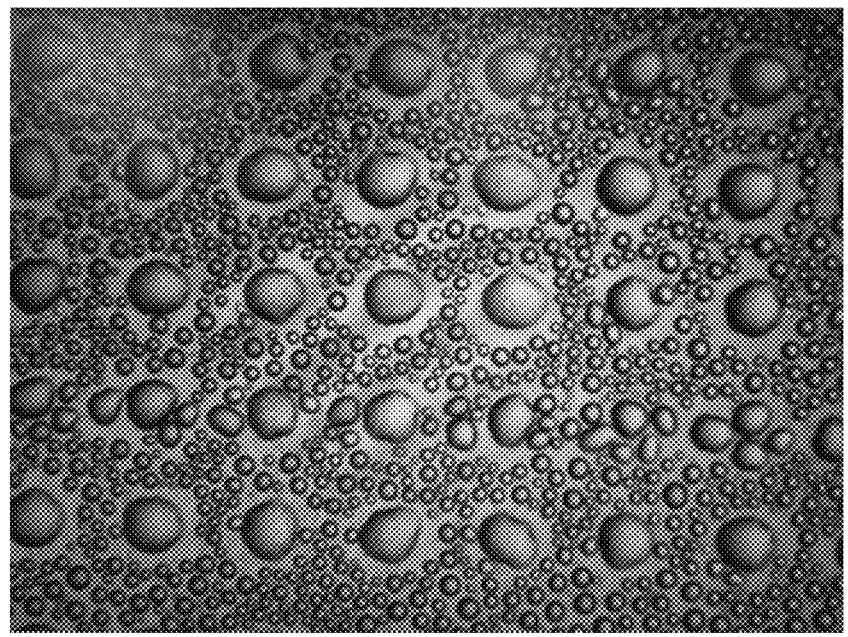
FIG. 7A is a photograph of distribution of droplets spontaneously formed by direct treatment with a large amount of water vapor on the surface of the substrate differentially functionalized by the fluoride etching ink printing method.

FIG. 7A is a photograph of distribution of droplets spontaneously formed by direct treatment with a large amount of water vapor on the surface of the substrate differentially functionalized by the fluoride etching ink printing method of the present embodiment. As can be seen, patterned areas exhibit high hydrophilicity, while other areas exhibit hydrophobicity. The patterned areas can be used for subsequent synthesis of oligonucleotides.

Figure 7B:
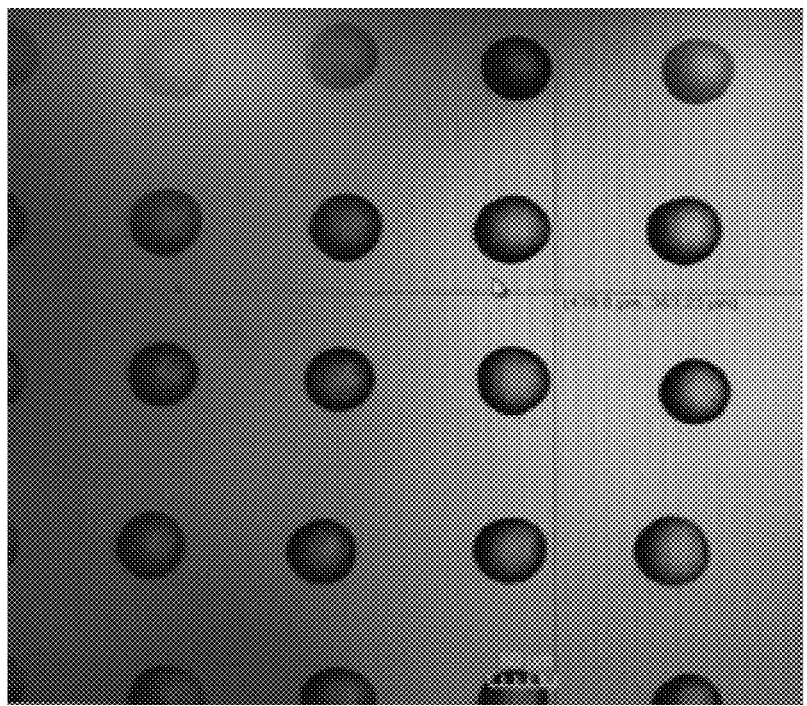
FIG. 7B is a photograph is a photograph of distribution of droplets formed after printing with a phosphoramidite monomer ink used for synthesis of oligonucleotides on the surface of the substrate differentially functionalized by the fluoride etching ink printing method.

FIG. 7B is a photograph of distribution of droplets formed after printing with a phosphoramidite monomer ink used for synthesis of oligonucleotides on the surface of the substrate differentially functionalized by the fluoride etching ink printing method of the present embodiment. It can be seen that patterned areas used for the synthesis exhibit good droplet morphology.

Figure 8:
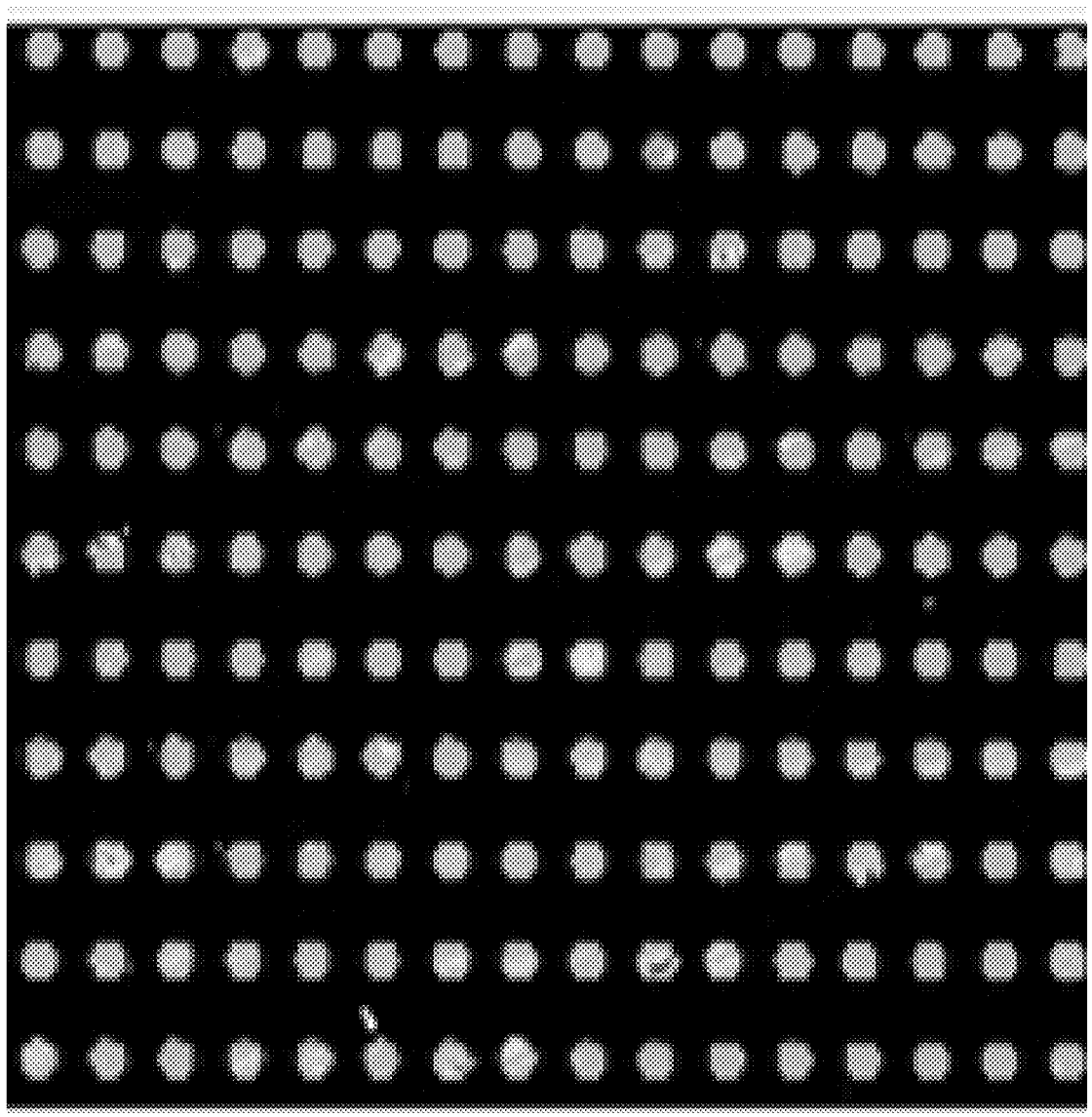
FIG. 8 is a diagram showing effect of microarray-based synthesis of oligonucleotides with 150 bases on the surface of the substrate treated and functionalized by the fluoride etching ink printing method of the present disclosure.

FIG. 8 is a diagram showing effect of microarray-based synthesis of oligonucleotides with 150 bases on the surface of the substrate treated and functionalized by the fluoride etching ink printing method of the present embodiment, with the last base indicated by a Cy3 fluorescently labeled monomer. It can be seen from this figure that after 150 rounds of synthesis, synthetic features of the oligonucleotides still maintain good morphology, and the synthesized last base being fluorescently labeled indicates that the surface treated and functionalized according to the present disclosure remains normal after repeated rinsing. The method can be successfully used for high-throughput synthesis of long-chain oligonucleotides.

INDUSTRIAL APPLICATION

By using the method of the present disclosure, a functionalized surface with given areas being patterned can be formed on a surface of a substrate, and then a same multi-channel piezoelectric inkjet head assembly can be directly used for subsequent high-resolution printing of phosphoramidite monomers and synthesis of nucleic acids. Compared with current methods of the same kind, the method of the present disclosure does not require expensive photolithography devices and designs for repeated position calibration, thereby reducing synthesis cost. The method can also increase density of available active sites on functionalized sites, and improve yield of a single oligonucleotide.

The invention claimed is:

1. A surface functionalizing method for use in high-throughput in situ synthesis of nucleic acids by 3D inkjet printing, consisting of the following steps:
    1) subjecting a surface of a substrate to hydroxyl enrichment treatment;
    2) adding hydrophobic molecules to the surface of the substrate, wherein the hydrophobic molecules do not react with phosphoramidite monomers;
    3) spraying, by a multi-channel piezoelectric inkjet head assembly, an etching ink to a predetermined area on the surface of the substrate for micro-etching,
    wherein the etching ink is prepared with a fluoride compound,
    wherein the fluoride compound reacts with the hydrophobic molecules, thereby selectively removing the hydrophobic molecules and exposing hydroxyl groups on the surface of the substrate; and
    4) applying hydrophilic molecules to the entire area of the surface of the substrate, reacting the hydrophilic molecules applied to the etched predetermined area with the hydroxyl groups exposed through micro-etching, and rinsing the remaining hydrophilic molecules with acetonitrile solution, by which functionalizing of the surface of the substrate is realized, wherein the hydrophilic molecules only react with hydroxyl groups, and do not react with the hydrophobic molecules, wherein the hydrophilic molecules are selected from the group consisting of
    3-glycidyloxypropyltrimethoxysilane,
    N-(3-triethoxysilylpropyl)-4-hydroxybutyramide,
    11-acetoxyundecyltriethoxysilane,
    n-decyltriethoxysilane,
    (3-aminopropyl)trimethoxysilane,
    3-iodo-propyltrimethoxysilane, and
    mixtures thereof.

2. The method according to claim 1, wherein the substrate is a quartz glass slide or a silicon slice provided with a silicon dioxide coating.

3. The method according to claim 1, wherein in step 1), the hydroxyl enrichment treatment is carried out using a piranha solution.

4. The method according to claim 1, wherein in step 2), the hydrophobic molecules are fluorooctyltrichlorosilane, (tridecafluoro-1,1,2,2-tetrahydrooctyl)trichlorosilane, or (tridecafluoro-1,1,2,2-tetrahydrooctyl)trimethoxysilane.

5. The method according to claim 1, wherein in step 3), the fluoride compound is at least one selected from the group consisting of ammonium fluoride, tetrabutylammonium fluoride, phenyltrimethyl ammonium fluoride, triethylamine trihydrofluoride, and pyridine hydrofluoride.

6. The method according to claim 1, wherein in step 3), a solvent is used for preparing the etching ink and the solvent has the following characteristics:
    1) the solvent has certain capability of dissolving the fluoride compound;
    2) the etching ink prepared with the solvent is capable of forming ink droplets with good morphology when sprayed through a nozzle of the multi-channel piezoelectric inkjet head assembly.

7. The method according to claim 6, wherein the solvent used for preparing the etching ink is one or more selected from the group consisting of polypropylene carbonate, polyethylene glycol, acetonitrile, 2-methylglutaronitrile, and 3-methoxypropionitrile.

8. The method according to claim 7, wherein in step 3), the fluoride compound is at least one selected from the group consisting of ammonium fluoride, tetrabutylammonium fluoride, phenyltrimethyl ammonium fluoride, triethylamine trihydrofluoride, and pyridine hydrofluoride.

9. The method according to claim 8, wherein in step 2), the hydrophobic molecules are fluorooctyltrichlorosilane, (tridecafluoro-1,1,2,2-tetrahydrooctyl)trichlorosilane, or (tridecafluoro-1,1,2,2-tetrahydrooctyl)trimethoxysilane.

10. The method according to claim 9, wherein in step 3), the multi-channel piezoelectric inkjet head assembly comprises six channels, each channel comprising 180-256 independent nozzles.

11. The method according to claim 1, wherein in step 3), the multi-channel piezoelectric inkjet head assembly comprises six channels, each channel comprising 180-256 independent nozzles.

* * * * *